US 8,718,374 B2

(12) United States Patent
Ashbrook

(10) Patent No.: US 8,718,374 B2
(45) Date of Patent: May 6, 2014

(54) METHOD AND APPARATUS FOR ACCESSING AN ELECTRONIC RESOURCE BASED UPON A HAND-DRAWN INDICATOR

(75) Inventor: Daniel L. Ashbrook, Santa Monica, CA (US)

(73) Assignee: Nokia Corporation, Espoo (FI)

( * ) Notice: Subject to any disclaimer, the term of this patent is extended or adjusted under 35 U.S.C. 154(b) by 142 days.

(21) Appl. No.: 13/212,692

(22) Filed: Aug. 18, 2011

(65) Prior Publication Data

US 2013/0044954 A1    Feb. 21, 2013

(51) Int. Cl.
*G06K 9/62*    (2006.01)

(52) U.S. Cl.
USPC .......................................... 382/186; 382/188

(58) Field of Classification Search
None
See application file for complete search history.

(56) References Cited

U.S. PATENT DOCUMENTS

| | | | |
|---|---|---|---|
| 6,249,606 B1 * | 6/2001 | Kiraly et al. | 382/195 |
| 2004/0240739 A1 * | 12/2004 | Chang et al. | 382/186 |
| 2009/0154759 A1 | 6/2009 | Koskinen et al. | |

OTHER PUBLICATIONS

Jermyn et al., "The Design and Analysis of Graphical Passwords," 1999, The USENIX Association, 20 pages.*
Read and Create QR 2D Barcode with Your iPhone | Quick Tips [online] [retrieved Jun. 24, 2011]. Retrieved from the Internet: <URL: http://quickwebtips.info/read-and-create-qr-2d-barcode-with-your-iphone/>. 4 pages.
Yahoo! Message Boards—Show off your Pipe—2D Barcode Generator (mobile phones) [online] [retrieved Jun. 24, 2011]. Retrieved from the Internet: <URL: http://discuss.pipes.yahoo.com/Message_Boards_for_Pipes/threadview?m=tm&bn=pip-Sh . . . >. 1 page.
Mobile Barcode Link Generator—Free Barcode Image for Your Site [online] [retrieved Jun. 24, 2011]. Retrieved from the Internet: <URL: http://www.barcodelink.net/>. 2 pages.
DataMatrix 2D Barcode Generator—The Free Bar Code Creator [online] [retrieved Jun. 24, 2011]. Retrieved from the Internet: <URL: http://www.racoindustries.com/barcodegenerator/2d/datamatrix.aspx>. 2 pages.
QR Code Generator: QR Stuff Free Online QR Code Creator and Encoder for T-Shirts, . . . [online] [retrieved Jun. 24, 2011]. Retrieved from the Internet: <URL: http://www.qrstuff.com/>. 2 pages.
Anoto—Anoto Digital Pens [online] [retrieved Oct. 17, 2011]. Retrieved from the Internet: <URL: http://www.anoto.com/digital-pens-1>. 1 page.
Anoto—The Technology [online] [retrieved Oct. 17, 2011]. Retrieved from the Internet: <URL: http://www.anoto.com/the-technology-1.aspx>. 1 page.
TinyURL.com—shorten that long URL into a tiny URL [online] [retrieved Oct. 17, 2011]. Retrieved from the Internet: <URL: http://tinyurl.com/>. 3 pages.
bitly | shorten, share and track your links [online] [retrieved Oct. 17, 2011]. Retrieved from the Internet: <URL: http://bitly.com/pages/about/>. 1 page.
QR code—Wikipedia, the free encyclopedia [online] [retrieved Oct. 17, 2011]. Retrieved from the Internet: <URL: http://en.wikipedia.org/wiki/Qr_code>. 1 page.

* cited by examiner

*Primary Examiner* — Brian P Werner
(74) *Attorney, Agent, or Firm* — Alston & Bird LLP

(57) ABSTRACT

A method, apparatus and computer program product are provided for permitting access to an electronic resource that is associated with a hand-drawn indicator. In the context of a method, a method is provided that includes receiving an image of a hand-drawn indicator, such as a free-form hand-drawn indicator or a grid having a plurality of selectively fillable grid elements. The method may also identify an electronic resource associated with the hand-drawn indicator and permit access to the electronic resource associated with the hand-drawn indicator.

20 Claims, 10 Drawing Sheets

METHOD AND APPARATUS FOR ACCESSING AN ELECTRONIC RESOURCE BASED UPON A HAND-DRAWN INDICATOR

TECHNOLOGICAL FIELD

An example embodiment of the present invention relates generally to techniques for accessing electronic resources and, more particularly, to a method and apparatus for accessing an electronic resource based upon a hand-drawn indicator.

BACKGROUND

Notwithstanding the prevalence of personal computers, cellular telephones, personal digital assistants (PDAs) and other computing and/or communications devices, people may sometimes still prefer to write or sketch by hand. For example, a person may wish to write or sketch on paper, on a whiteboard, or on other types of non-electronic media. While writing or sketching by hand, a person may want to reference an electronic resource, such as a website or other electronic information, such as a map, a photograph, a song, a video, a list of contacts or the like, that is available online or is otherwise stored in an electronic form. In many instances, the electronic resource may be identified by an address, such as a uniform resource locator (URL). In order to make reference to the electronic resource in a manner that facilitates subsequent access to the electronic resource, the user may include the address, such as the URL, in their written work. Thereafter, the person reviewing the user's handwritten work may access the electronic resource by entering the address, such as the URL, into a computing or communications device.

However, the addresses, such as the URLs, of electronic resources are generally quite lengthy. Thus, the writing of the address in the handwritten work and the subsequent entry of the address into a computing or communications device may take some time and effort and may be prone to errors. In this regard, errors relating to the address of an electronic resource may include mistakes in writing the address or in subsequently typing or otherwise re-entering the address, such as mistakes attributable to being unable to clearly read the handwritten address while endeavoring to enter the address into a computing or communications device.

In an effort to electronically capture handwritten information, digital pens may be utilized in order to allow specific areas of a page to be associated with electronic information. However, digital pen technology generally requires the use of a particular pen which may include a camera and specific types of paper, such as paper which includes a grid of microdots to allow the pen to be accurately located relative to the page, such as based upon an image of the page that is captured by the camera of the pen.

Techniques have also been developed to shorten a URL, such as by compressing a lengthy URL into a shorter URL in an effort to simply the manner in which a URL is referenced. In accordance with these techniques, a database may store both the original, longer URL and the compressed or shorter URL so as to link the two related URLs. As such, a user may generate a shorter URL that is representative of a longer URL and may then include the shorter URL in the handwritten work. Although a shorter URL may be simpler to write, a user must have access to a computing or communications device to obtain the shorter representation of the URL and must then tediously and accurately copy the shorter URL from the display of the computing or communications device into their handwritten work. Additionally, shorter URLs may sometimes be ambiguous to read and write depending upon the font in which the shorter URLs are displayed.

A user may alternatively reference an electronic resource by a barcode or quick response (QR) code that serves to encode information, such as URLs. However, a barcode or QR code is generally difficult or at least time consuming to draw and is therefore unlikely to be readily adopted by users for inclusion in handwritten writings or sketches. In order to avoid the challenges associated with drawing a barcode or QR code, the barcode or QR code could be printed on stickers that may then be placed on a piece of paper upon which the user is writing. However, the use of such stickers requires access to a computing device and an associated printer for generating the stickers. Additionally, in some instances, the user may not wish to place a sticker upon the medium, such as a whiteboard, upon which the user is writing since the medium may be reused on multiple occasions.

BRIEF SUMMARY

A method, apparatus and computer program product are therefore provided according to an example embodiment of the present invention for permitting access to an electronic resource that is associated with a hand-drawn indicator. A person may therefore reference the electronic resource in their handwritten work, such as a writing or a sketch, by the hand-drawn indicator. The hand-drawn indicator may be recognized in an automated manner so as to avoid the challenges that may otherwise be associated with interpreting and typing or otherwise re-entering a handwritten address, such as a URL, into a computing or communications device in an effort to access the associated electronic resource. Accordingly, the method, apparatus and computer program product of an example embodiment of the present invention may facilitate reference to an electronic resource in a handwritten work by use of the hand-drawn indicator such that the electronic resource that is associated with the hand-drawn indicator may be efficiently accessed in a manner that is less prone to errors.

In one embodiment, a method is provided that includes receiving an image of a hand-drawn indicator, such as a free-form hand-drawn indicator or a grid having a plurality of selectively fillable grid elements. The method of this embodiment may also identify, with a processor, an electronic resource associated with the hand-drawn indicator and permit access to the electronic resource associated with the hand-drawn indicator. In order to facilitate recognition of the hand-drawn indicator, the method may also receive an indication of a portion of the image that includes the hand-drawn indicator. In one embodiment, the method may receive not only an image of a hand-drawn indicator, but also an indication of an account with which the hand-drawn indicator is related.

The identification of an electronic resource may, in one embodiment, include identifying the hand-drawn indicator to be a representation of a reference indicator and determining the electronic resource that is associated with the reference indicator. As such, the electronic resource may be associated with the hand-drawn indicator. In this embodiment, the method may also include maintaining a plurality of associations between reference indicators and corresponding electronic resources. The method of this embodiment may also include establishing an association between a reference indicator and a corresponding electronic resource. In this regard, the establishment of the association between a reference indicator and a corresponding electronic resource may include receiving an image of the reference indicator, receiving an indication of the corresponding electronic resource and associating the reference indicator to the corresponding electronic resource.

In another embodiment, an apparatus is provided that includes at least one processor and at least one memory including computer program code with the at least one memory and the computer program code configured to, with the processor, cause the apparatus to at least receive an image of a hand-drawn indicator, such as a free-form hand-drawn indicator or a grid having a plurality of selectively fillable grid elements. The at least one memory and the computer program code may also be configured to, with the processor, cause the apparatus of this embodiment to identify an electronic resource associated with the hand-drawn indicator and to permit access to the electronic resource associated with the hand-drawn indicator. In order to facilitate recognition of the hand-drawn indicator, the at least one memory and the computer program code may also be configured to, with the processor, cause the apparatus to receive an indication of a portion of the image that includes the hand-drawn indicator. In one embodiment, the at least one memory and the computer program code may also be configured to, with the processor, cause the apparatus to receive not only an image of a hand-drawn indicator, but also an indication of an account with which the hand-drawn indicator is related.

The identification of an electronic resource may, in one embodiment, include identifying the hand-drawn indicator to be a representation of a reference indicator and determining the electronic resource that is associated with the reference indicator. As such, the electronic resource may be associated with the hand-drawn indicator. In this embodiment, the at least one memory and the computer program code may also be configured to, with the processor, cause the apparatus to maintain a plurality of associations between reference indicators and corresponding electronic resources. The at least one memory and the computer program code may also be configured to, with the processor, cause the apparatus of this embodiment to establish an association between a reference indicator and a corresponding electronic resource. In this regard, the establishment of the association between a reference indicator and a corresponding electronic resource may include receiving an image of the reference indicator, receiving an indication of the corresponding electronic resource and associating the reference indicator to the corresponding electronic resource.

In a further embodiment, a computer program product is provided that includes at least one non-transitory computer-readable storage medium having computer-executable program code instructions stored therein. The computer-executable program code instructions include program code instructions to receive an image of a hand-drawn indicator, such as a free-form hand-drawn indicator or a grid having a plurality of selectively fillable grid elements. The computer-executable program code instructions of this embodiment also include program code instructions to identify an electronic resource associated with the hand-drawn indicator and to permit access to the electronic resource associated with the hand-drawn indicator. In order to facilitate recognition of the hand-drawn indicator, the computer-executable program code instructions may include program code instructions to receive an indication of a portion of the image that includes the hand-drawn indicator. In one embodiment, the computer-executable program code instructions for identifying an electronic resource may include program code instructions to identify the hand-drawn indicator to be a representation of a reference indicator and to determine the electronic resource that is associated with the reference indicator. As such, the electronic resource may be associated with the hand-drawn indicator.

BRIEF DESCRIPTION OF THE DRAWINGS

Figure 1:
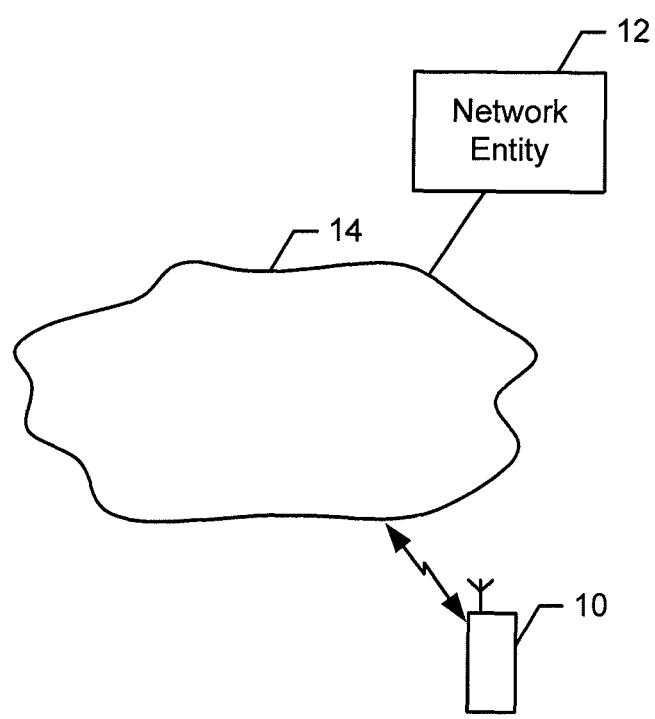
Figure 2:
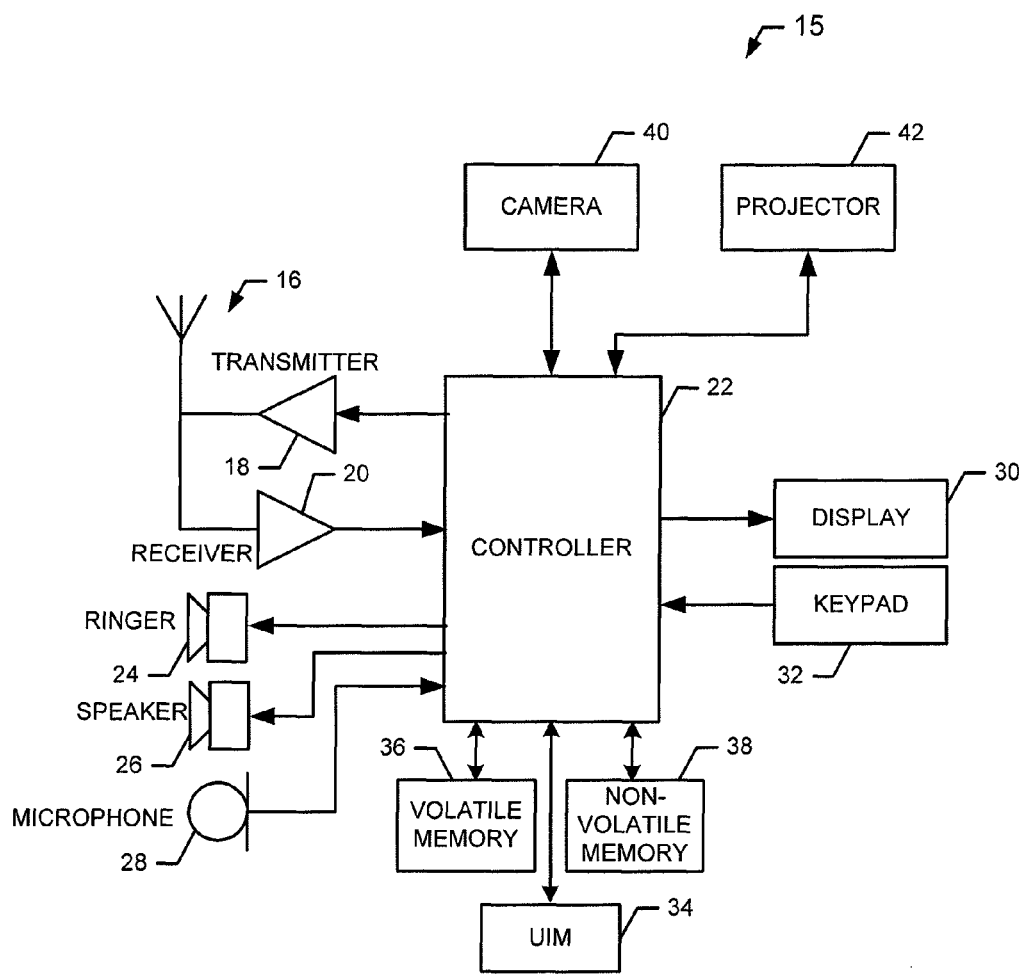
Figure 3:
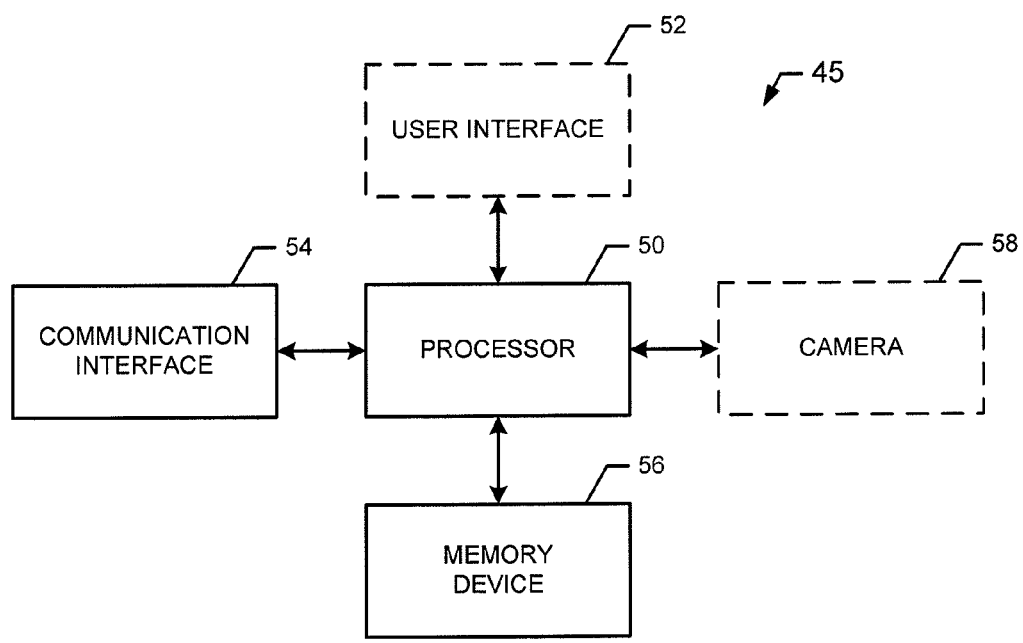
Figure 4:
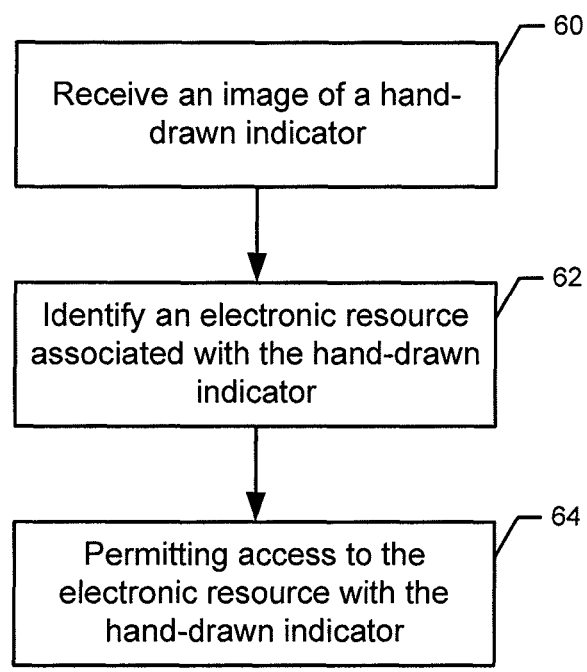
Figure 5:
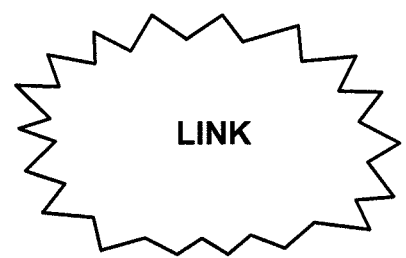
Figure 6:
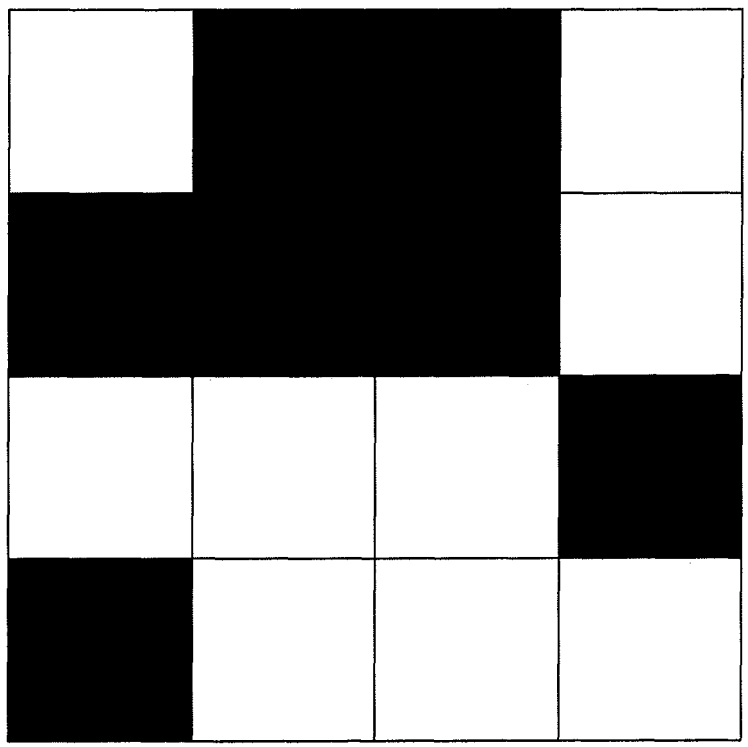
Figure 7:
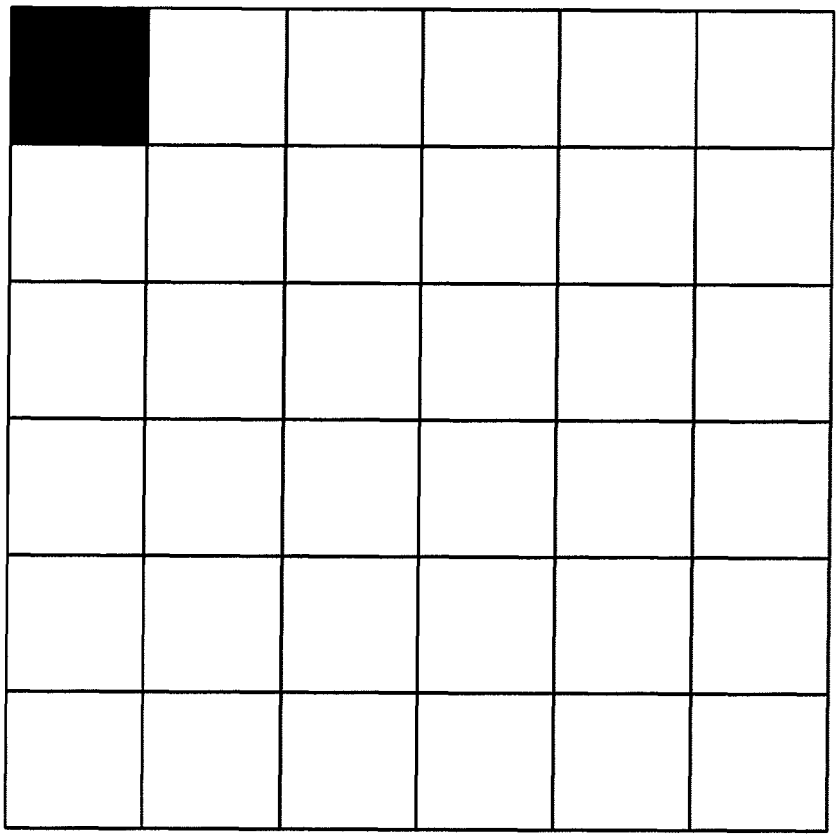
Figure 8:
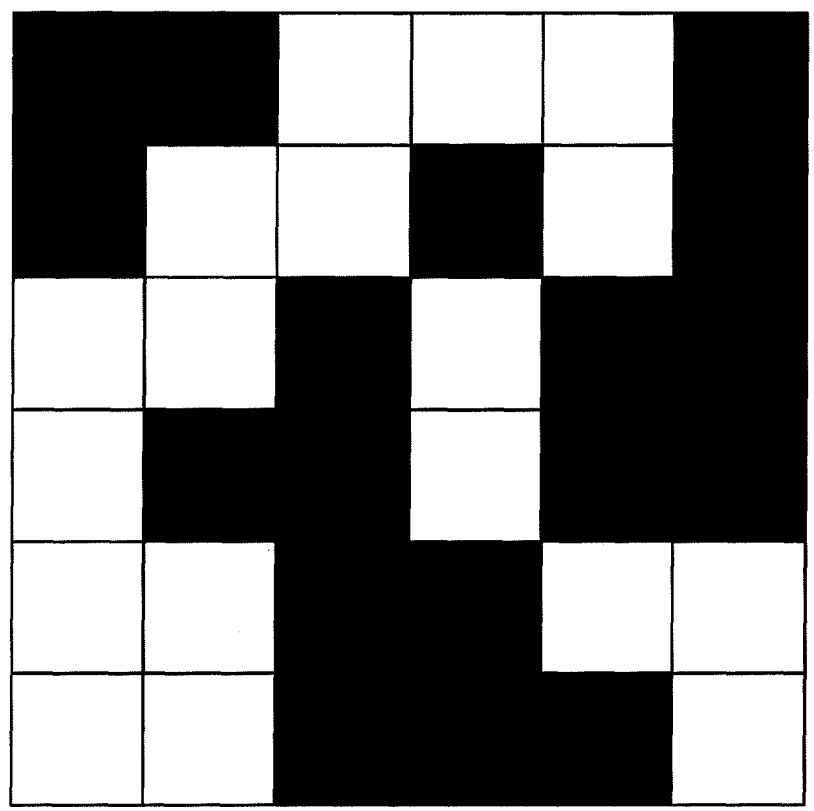
Figure 9:
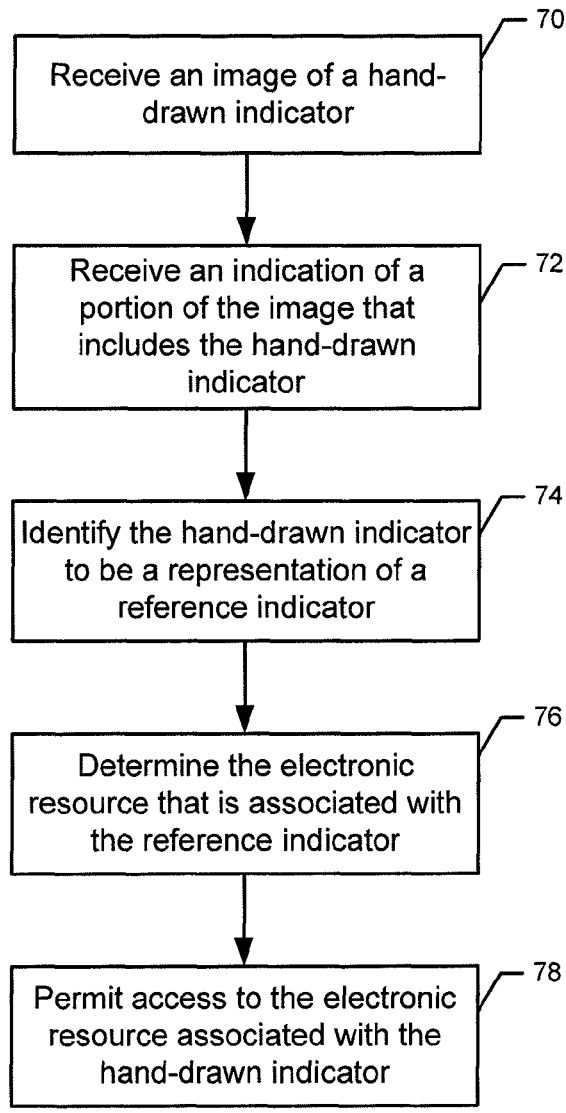
Figure 10:
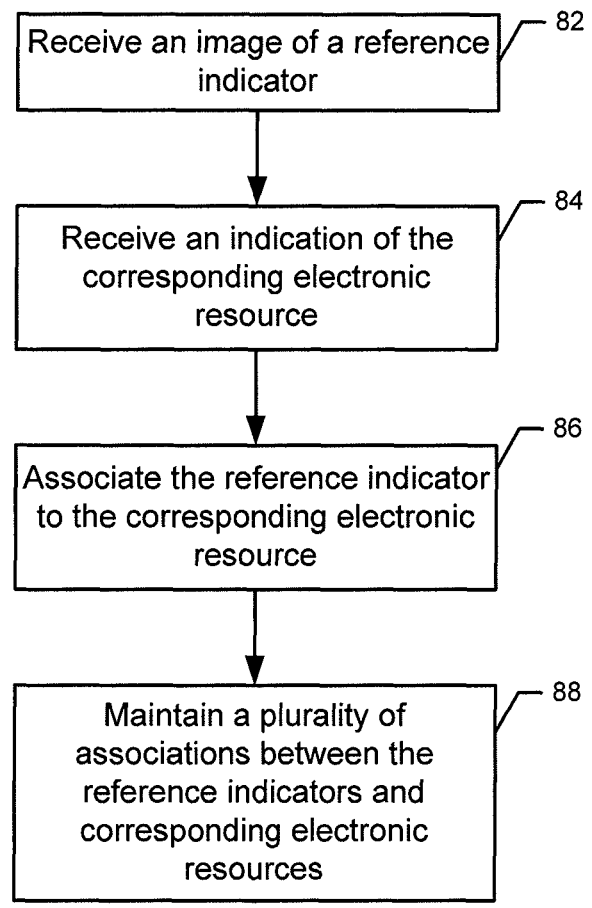

Having thus described example embodiments of the invention in general terms, reference will now be made to the accompanying drawings, which are not necessarily drawn to scale, and wherein:

FIG. 1 is a schematic representation of a system including a mobile terminal and a network entity, such as a server, that may support example embodiments of the present invention;

FIG. 2 is a block diagram of a mobile terminal that may be configured to implement example embodiments of the present invention;

FIG. 3 is a block diagram of an apparatus that may be embodied by a mobile terminal or a network entity, such as a server, and may be configured to implement example embodiments of the present invention;

FIG. 4 is a flowchart illustrating the operations performed in accordance with one embodiment of the present invention;

FIG. 5 is one example of a free-form hand-drawn indicator that may be utilized in accordance with example embodiments of the present invention in order to permit access to an associated electronic resource;

FIGS. 6-8 are other examples of grid-based hand-drawn indicators that may be utilized in accordance with example embodiments of the present invention in order to permit access to associated electronic resources;

FIG. 9 is a flowchart illustrating operations performed in accordance with another example embodiment of the present invention; and FIG. 10 is a flowchart illustrating the operations performed in order to establish the associations between reference indicators and corresponding electronic resources in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As described below, a method, apparatus and computer program product are provided to facilitate access to electronic resources based upon hand-drawn indicators. In this regard, the method, apparatus and computer program product of an example embodiment may access an electronic resource in an at least partially automated fashion so as to avoid, or at least reduce, the issues associated with manually writing and then re-entering the address, such as the URL, of the electronic resource. Indeed, the method, apparatus and computer program product of one embodiment may access electronic resources based upon hand-drawn indicators in an efficient manner that may be less prone to errors by reducing the instances in which the hand-drawn indicator must be manually entered.

In one embodiment, a user device may be configured to not only capture an image of the hand-drawn indicator, but to also store the electronic resources and to maintain the associations between the hand-drawn indicator and an electronic resource. However, the user device of another embodiment may be configured to capture an image of the hand-drawn indicator, but may be in communication with and rely upon a network entity, such as a server, for storing the electronic resources and, in one embodiment, for maintaining the associations between the hand-drawn indicator and an electronic resource. In this regard, FIG. 1 illustrates a block diagram of a system for accessing an electronic resource based upon a hand-drawn indicator. While FIG. 1 illustrates one example of a configuration of a system for accessing an electronic resource, numerous other configurations may be used to implement embodiments of the present invention.

With reference to FIG. 1, however, the system may include a user device 10 and a network entity 12, such as a server, that are configured to communicate over a network 14. The user device 10 may be any device that is configured to capture or otherwise receive an image of a hand-drawn indicator in order to access an electronic resource that is associated with the hand-drawn indicator. For example, the user device 10 may be a mobile terminal, such as shown in FIG. 2, and may consist of or include an apparatus 45, such as shown in FIG. 3, configured in accordance with embodiments of the present invention, as described below.

The network entity 12 may be a server or other network-accessible device that may store or otherwise provide access to the electronic resources that are associated with corresponding hand-drawn indicators. In one embodiment, the network entity 12 consists of or includes an apparatus 45, such as shown in FIG. 3, configured in accordance with embodiments of the present invention, as described below.

Turning now to FIG. 2, a block diagram of a mobile terminal 15 that would benefit from embodiments of the present invention is illustrated. It should be understood, however, that the mobile terminal 15 as illustrated and hereinafter described is merely illustrative of one type of user device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other user devices including fixed (non-mobile) electronic devices may also employ some example embodiments.

The mobile terminal 15 may include an antenna 16 (or multiple antennas) in operable communication with a transmitter 18 and a receiver 20. The mobile terminal 15 may further include an apparatus, such as a processor 22 or other processing device (e.g., processor 50 of the apparatus of FIG. 3), which controls the provision of signals to and the receipt of signals from the transmitter 18 and receiver 20, respectively. The signals may include signaling information in accordance with the air interface standard of the applicable cellular system, and also user speech, received data and/or user generated data. In this regard, the mobile terminal 15 is capable of operating with one or more air interface standards, communication protocols, modulation types, and access types. By way of illustration, the mobile terminal 15 is capable of operating in accordance with any of a number of first, second, third and/or fourth-generation communication protocols or the like. For example, the mobile terminal 15 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 15 may be capable of operating in accordance with non-cellular communication mechanisms. For example, the mobile terminal 15 may be capable of communication in a wireless local area network (WLAN) or other communication networks.

In some embodiments, the processor 22 may include circuitry desirable for implementing audio and logic functions of the mobile terminal 15. For example, the processor 22 may be comprised of a digital signal processor device, a microprocessor device, and various analog to digital converters, digital to analog converters, and other support circuits. Control and signal processing functions of the mobile terminal 15 are allocated between these devices according to their respective capabilities. The processor 22 thus may also include the functionality to convolutionally encode and interleave message and data prior to modulation and transmission. The processor 22 may additionally include an internal voice coder, and may include an internal data modem. Further, the processor 22 may include functionality to operate one or more software programs, which may be stored in memory. For example, the processor 22 may be capable of operating a connectivity program, such as a conventional Web browser. The connectivity program may then allow the mobile terminal 15 to transmit and receive Web content, such as location-based content and/or other web page content, according to a Wireless Application Protocol (WAP), Hypertext Transfer Protocol (HTTP) and/or the like, for example.

The mobile terminal 15 may also comprise a user interface including an output device such as a conventional earphone or speaker 26, a ringer 24, a microphone 28, a display 30, and a user input interface, all of which are coupled to the processor 22. The user input interface, which allows the mobile terminal 15 to receive data, may include any of a number of devices allowing the mobile terminal 15 to receive data, such as a keypad 32, a touch screen display (display 30 providing an example of such a touch screen display) or other input device. In embodiments including the keypad 32, the keypad 32 may include the conventional numeric (0-9) and related keys (#, *), and other hard and soft keys used for operating the mobile terminal 15. Alternatively or additionally, the keypad 32 may include a conventional QWERTY keypad arrangement. The keypad 32 may also include various soft keys with associated functions. In addition, or alternatively, the mobile terminal 15 may include an interface device such as a joystick or other user input interface. Some embodiments employing a touch screen display, as described further below, may omit the keypad 32 and any or all of the speaker 26, ringer 24, and microphone 28 entirely. The mobile terminal 15 further includes a battery, such as a vibrating battery pack, for powering various circuits that are required to operate the mobile terminal 15, as well as optionally providing mechanical vibration as a detectable output.

The mobile terminal 15 may further include a user identity module (UIM) 34. The UIM 34 is typically a memory device having a processor built in. The UIM 34 may include, for example, a subscriber identity module (SIM), a universal integrated circuit card (UICC), a universal subscriber identity module (USIM), a removable user identity module (R-UIM), etc. The UIM 34 typically stores information elements related to a mobile subscriber. In addition to the UIM 34, the mobile terminal 15 may be equipped with memory. For example, the mobile terminal 15 may include volatile memory 36, such as volatile Random Access Memory (RAM) including a cache area for the temporary storage of data. The mobile terminal 15 may also include other non-volatile memory 38, which may be embedded and/or may be removable. The memories may store any of a number of pieces of information, and data, used by the mobile terminal 15 to implement the functions of the mobile terminal 15.

In some embodiments, the mobile terminal 15 may include a camera 40 or other media capturing element configured to capture images including images of a handwritten work including a hand-drawn indicator. In an example embodiment, the camera 40 is in communication with the processor 22. As noted above, the camera 40 may be any means for capturing an image for analysis, display and/or transmission. For example, the camera 40 may include a digital camera capable of forming a digital image file from a captured image. As such, the camera 40 includes all hardware, such as a lens or other optical device, and software necessary for creating a digital image file from a captured image. Alternatively, the camera 40 may include only the hardware needed to view an image, while a memory device of the mobile terminal 15 stores instructions for execution by the processor 22 in the form of software necessary to create a digital image file from a captured image. In an example embodiment, the camera 40 may further include a processing element such as a co-processor which assists the processor 22 in processing image data and an encoder and/or decoder for compressing and/or decompressing image data. The encoder and/or decoder may encode and/or decode according to a joint photographic experts group (JPEG) standard format. The images that are recorded may be stored for future viewings and/or manipulations on a memory of the mobile terminal 15, such as the non-volatile memory 38, and/or on a memory external to the mobile terminal 15 itself, such as a memory of the network entity 12.

In one embodiment, the mobile terminal 15 may also optionally include a projector 42 configured to cause an image, such as a predefined image, to be projected upon a surface, such as a piece of paper, a whiteboard or other medium upon which a user may write, sketch or the like. As described below, a projector 42 of one embodiment may be configured to project a predefined grid comprised of a plurality of grid elements upon the surface to facilitate the selective filling of one or more of the grid elements by the user.

An example embodiment of the invention will now be described with reference to FIG. 3, in which certain elements of an apparatus 45 for accessing an electronic resource based upon a hand-drawn indicator are depicted. The apparatus 45 of FIG. 3 may be employed, for example, in conjunction with the user device 10 of FIG. 1, such as with the mobile terminal 15 of FIG. 2. However, it should be noted that the apparatus 45 of FIG. 3 may also be employed in connection with a variety of other devices, both mobile and fixed, and therefore, embodiments of the present invention should not be limited to application on devices such as the mobile terminal 15 of FIG. 2. For example, the apparatus 45 may be employed on a personal computer or other user terminal. Moreover, in some cases, the apparatus 45 may be on a fixed device such as a network entity 12, e.g., a server or other service platform, and the electronic resource may be presented (e.g., via a server/client relationship) on a remote device such as the user device 10, e.g., the mobile terminal, based on processing that occurs at the fixed device.

It should also be noted that while FIG. 3 illustrates one example of a configuration of an apparatus 45 for accessing an electronic resource based upon a hand-drawn indicator, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 3, the apparatus 45 for accessing an electronic resource based upon a hand-drawn indicator may include or otherwise be in communication with a processor 50, a communication interface 54, and a memory device 56. As described below and as indicated by the dashed lines in FIG. 3, the apparatus 45 may also optionally include a user interface 52 and/or a camera 58 in some embodiments, such as embodiments in which the apparatus 45 is embodied as a user device 10. In some embodiments, the processor 50 (and/or co-processors or any other processing circuitry assisting or otherwise associated with the processor 50) may be in communication with the memory device 56 via a bus for passing information among components of the apparatus 45. The memory device 56 may include, for example, one or more volatile and/or non-volatile memories. In other words, for example, the memory device 56 may be an electronic storage device (e.g., a computer readable storage medium) comprising gates configured to store data (e.g., bits) that may be retrievable by a machine (e.g., a computing device like the processor 50). In the embodiment in which the apparatus 45 is embodied as a mobile terminal 15, the memory device 56 may be embodied by the memory 42, 44. The memory device 56 may be configured to store information, data, content, applications, instructions, or the like for enabling the apparatus to carry out various functions in accordance with an example embodiment of the present invention. For example, the memory device 56 could be configured to buffer input data for processing by the processor 50. Additionally or alternatively, the memory device 56 could be configured to store instructions for execution by the processor 50.

The apparatus 45 may, in some embodiments, be a user terminal (e.g., mobile terminal 15) or a fixed communication device or computing device (e.g., network entity 12) configured to employ an example embodiment of the present invention. However, in some embodiments, the apparatus 45 may be embodied as a chip or chip set. In other words, the apparatus 45 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 45 may therefore, in some cases, be configured to implement an embodiment of the present invention on a single chip or as a single "system on a chip." As such, in some cases, a chip or chipset may constitute means for performing one or more operations for providing the functionalities described herein.

The processor 50 may be embodied in a number of different ways. For example, the processor 50 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 50 may include one or more processing cores configured to perform independently. A multi-core processor may enable multiprocessing within a single physical package. Additionally or alternatively, the processor 50 may include one or more processors configured in tandem via the bus to enable independent execution of instructions, pipelining and/or multithreading. In the embodiment in which the apparatus 45 is embodied as a mobile terminal 15, the processor 50 may be embodied by the processor 22.

In an example embodiment, the processor 50 may be configured to execute instructions stored in the memory device 56 or otherwise accessible to the processor 50. Alternatively or additionally, the processor 50 may be configured to execute hard coded functionality. As such, whether configured by hardware or software methods, or by a combination thereof, the processor 50 may represent an entity (e.g., physically embodied in circuitry) capable of performing operations according to an embodiment of the present invention while configured accordingly. Thus, for example, when the processor 50 is embodied as an ASIC, FPGA or the like, the processor 50 may be specifically configured hardware for conducting the operations described herein. Alternatively, as another example, when the processor 50 is embodied as an executor of software instructions, the instructions may specifically configure the processor 50 to perform the algorithms and/or operations described herein when the instructions are executed. However, in some cases, the processor 50 may be a processor of a specific device (e.g., a mobile terminal or network entity) configured to employ an embodiment of the present invention by further configuration of the processor 50 by instructions for performing the algorithms and/or operations described herein. The processor 50 may include, among other things, a clock, an arithmetic logic unit (ALU) and logic gates configured to support operation of the processor 50.

Meanwhile, the communication interface 54 may be any means such as a device or circuitry embodied in either hardware or a combination of hardware and software that is configured to receive and/or transmit data from/to a network 14 and/or any other device or module in communication with the apparatus 45. In this regard, the communication interface 54 may include, for example, an antenna (or multiple antennas) and supporting hardware and/or software for enabling communications with a wireless communication network. Additionally or alternatively, the communication interface 54 may include the circuitry for interacting with the antenna(s) to cause transmission of signals via the antenna(s) or to handle receipt of signals received via the antenna(s). In some environments, the communication interface 54 may alternatively or also support wired communication. As such, for example, the communication interface 54 may include a communication modem and/or other hardware/software for supporting communication via cable, digital subscriber line (DSL), universal serial bus (USB) or other mechanisms. In the embodiment in which the apparatus 45 is embodied as a mobile terminal 15, the communication interface 54 may be embodied by the antenna 16, transmitter 18, receiver 20 or the like.

In some embodiments, such as instances in which the apparatus 45 is embodied by a user device 10, the apparatus 45 may include a user interface 52 that may, in turn, be in communication with the processor 50 to receive an indication of a user input and/or to cause provision of an audible, visual, mechanical or other output to the user. As such, the user interface 52 may include, for example, a keyboard, a mouse, a joystick, a display, a touch screen(s), touch areas, soft keys, a microphone, a speaker, or other input/output mechanisms. Alternatively or additionally, the processor 50 may comprise user interface circuitry configured to control at least some functions of one or more user interface elements such as, for example, a speaker, ringer, microphone, display, and/or the like. The processor 50 and/or user interface circuitry comprising the processor 50 may be configured to control one or more functions of one or more user interface elements through computer program instructions (e.g., software and/or firmware) stored on a memory accessible to the processor 50 (e.g., memory device 56, and/or the like). In other embodiments, however, such as in instances in which the apparatus 45 is embodied by a network entity 12, the apparatus 45 may not include a user interface 52.

In some embodiments, such as instances in which the apparatus 45 is embodied by a user device 10, the apparatus 45 may include a camera 58, such as camera 36 of the mobile terminal of FIG. 2, that is configured to capture images, such as images of a paper, whiteboard or other medium upon which the user writes, sketches or the like. In particular, the camera 58 may be configured to capture an image of a hand-drawn indicator that is included within the handwritten work of the user. In other embodiments, however, such as in instances in which the apparatus 45 is embodied by a network entity 12, the apparatus 45 may not include a camera 58.

Referring now to FIG. 4, the operations for accessing an electronic resource that is associated with a hand-drawn indicator are depicted. In this regard and as described below, the operations of FIG. 4 may be performed by an apparatus 45, such as shown in FIG. 3, and, in one embodiment, by a mobile terminal 15, such as depicted in FIG. 2. In this regard, the apparatus 45 may include means, such as the camera 58, the processor 50, the communication interface 54 or the like, for receiving an image of a hand-drawn indicator. In this regard, a person may have created a handwritten work, such as a writing, a sketch or other handwritten work, that includes one or more hand-drawn indicators, each of which is intended to represent or otherwise be associated with a respective electronic resource. A wide variety of hand-drawn indicators may be utilized in order to make reference to corresponding electronic resources. As shown in FIG. 5, a hand-drawn indicator may be an arbitrary drawing that may be included in the handwritten work. Although the hand-drawn indicator of FIG. 5 includes both a graphical element, such as the spiky outline of the shape, and an alphanumerical portion, e.g., the word LINK, the hand-drawn indicator may have any of a wide variety of shapes, formats, or the like and need not include alphanumerical information. In one embodiment, however, the hand-drawn indicator is clear and distinguishable, such as in terms of color, contrast or the like, relative to the medium, such as paper or a whiteboard, on which the hand-drawn indicator is drawn and relative to the text or other handwritten information that surrounds or is in the proximity of the hand-drawn indicator.

As an alternative to a hand-drawn indicator having an arbitrary shape, the hand-drawn indicator of the embodiment shown in FIGS. 6-8 may have a grid-based format. In this regard, a user may sketch a grid, such as a rectangular or other predefined arrangement of a plurality of grid elements, such as cells. The user may then selectively fill or color in one or more of the grid elements in order to define the hand-drawn indicator. As shown by comparing the grid-based hand-drawn indicator of FIG. 6 with those of FIGS. 7 and 8, the grid-based hand-drawn indicators may have different sizes and different numbers of grid elements. With reference to FIGS. 7 and 8, for example, grids of the same size and having the same number and arrangement of grid elements may have different grid elements selectively filled in by the user in order to create different hand-drawn indicators, each of which may be associated with a different electronic resource.

The grid of a grid-based hand-drawn indicator may be hand-drawn or may be defined in another manner. For example, a user may have a stamp that may be inked and then pressed on a piece of paper or other medium for imprinting a well-defined grid thereupon. Alternatively, an image of the underlying grid may be projected upon a piece of paper or other medium, such as by the projector 42 of the mobile terminal 15 of FIG. 2, such that the user may trace the grid and then selectively fill one or more grid elements in order to accurately define the grid-based hand-drawn indicator.

Regardless of the manner in which the hand-drawn indicator is created, an apparatus 45 in accordance with one embodiment of the present invention may include means, such as a camera 58, a processor 50, a communication interface 54 or the like, for receiving an image of the hand-drawn indicator. See operation 60 of FIG. 4. For example, in an embodiment in which the apparatus 45 is embodied by a mobile terminal 15, such as shown in FIG. 2, the mobile terminal 15 may include a camera 40 for capturing an image of the hand-drawn indicator and for providing the image or attributes of the image to the processor 22 for subsequent analysis. Alternatively, in an embodiment in which the analysis of a hand-drawn indicator is to be provided by a network entity 12, such as a server, the network entity 12 may not necessarily include a camera 58 for capturing an image of the hand-drawn indicator, but may include a processor 50 for receiving the image or attributes of the image of the hand-drawn indicator. As used herein, reference to an image of a hand-drawn indicator (or a reference indicator as described below in conjunction with FIG. 10) includes the image of the hand-drawn indicator and/or one or more attributes derived from the image of the hand-drawn indicator.

With reference to operation 62 of FIG. 4, the apparatus 45 of FIG. 3 may also include means, such as a processor 50 or the like, for identifying an electronic resource associated with the hand-drawn indicator. As described above, the apparatus 45 may be embodied by a user device 10, such as the mobile terminal of FIG. 2, or a network entity 12, such as a server. In either embodiment, the processor 50 may be configured to identify an electronic resource as associated with the hand-drawn indicator based upon the image of the hand-drawn indicator and/or various attributes of the image of the hand-drawn indicator. Further details regarding the manner in which the apparatus 45, such as the processor 50, may identify the electronic resource associated with the hand-drawn indicator are provided below in conjunction with the embodiment of FIG. 9.

The apparatus 45 may also include means, such as the processor 50, communications interface 54 or the like, for permitting access to the electronic resource that is associated with the hand-drawn indicator. See operation 64 of FIG. 4. In this regard, the apparatus 45 may permit access to various types of electronic resources that are associated with the hand-drawn indicator. For example, electronic resources that may be associated with hand-drawn indicators may include various types of content items, such as images, videos, maps or the like, applications, games or the like. The apparatus 45 may permit access to the electronic resources associated with the hand-drawn indicators in various manners including opening or launching the electronic resource or providing an address, such as a URL or other link, to the electronic resource that may be selected by the user in order to open or launch the electronic resource.

As noted above, the apparatus 45 of one embodiment may be embodied by a mobile terminal 15, such as shown in FIG. 2, such that the mobile terminal may include means, such as the processor 22, for permitting access to the electronic resource, for example, by opening or launching the electronic resource or by providing an address, such as a URL or other link, to the electronic resource that may be selected by the user in order to open or launch the electronic resource. Alternatively, the apparatus 45 may be embodied by a network entity 12, such as a server, which may include means, such as a processor 50, the communication interface 54 or the like, for providing the electronic resource or the address or other link to the electronic resource to the user device 10. In either embodiment, the apparatus 45 permits access to the electronic resource associated with the hand-drawn indicator in a manner that permits the user to draw a hand-drawn indicator that is, in turn, associated with an electronic resource that may be identified and accessed in an efficient, reliable manner that is less prone to errors.

In order to provide further details regarding an embodiment of the method, apparatus 45 and computer program product of one example embodiment, reference is now made to FIG. 9. In this embodiment, an image of the hand-drawn indicator is received, as shown in operation 70 of FIG. 9, such as in the manner described above in conjunction with operation 60 of FIG. 4. With reference to operation 72 of FIG. 9, the apparatus 45 may include means, such as the user interface 52, the processor 50, the communication interface 54 or the like, for receiving an indication of the portion of the image that includes the hand-drawn indicator. In this embodiment, an image of the hand-drawn indicator may be captured and may be displayed for review by a user. For example, an image of the hand-drawn indicator may be captured by the camera 58 and provided to the processor 50. The processor 50 may, in turn, cause the image of the hand-drawn indicator to be presented via a display for review by the user. Although the image of the hand-drawn indicator may only include the hand-drawn indicator, the image of the hand-drawn indicator may also include a number of other elements or information, such as writing or other drawings or sketches that surround or are proximate to the hand-drawn indicator. In order to permit the hand-drawn indicator to be identified, the user may provide an indication of that portion of the image that includes the hand-drawn indicator.

The apparatus 45 may be configured to receive a number of different types of indications. For example, in an embodiment in which the apparatus 45 is embodied by a mobile terminal 15 that includes a touch screen display, the indication of the portion of the image that includes the hand-drawn indicator may be provided by a tap by the user upon that portion of the image that includes the hand-drawn indicator. Alternatively, the indication may be a closed shape, such as a circle or the like, that is drawn or traced by the user upon the touch screen display so as to encircle the hand-drawn indicator. Indications may also be provided by the user via other techniques, either with a touch screen display or in other manners, such as by utilizing a mouse or other input device to select the portion of an image that includes the hand-drawn indicator. Alternatively, in an embodiment in which the apparatus 45 is embodied by a network entity 12, the indication of the portion of the image that includes the hand-drawn indicator may be provided by the user device 10, such as in response to user interaction with the user device 10 as described above. Once the portion of the image that includes the hand-drawn indicator has been indicated, the apparatus 45 may then utilize the hand-drawn indicator in that portion of the image without consideration of other information in other portions of the image.

As described above in conjunction with operation 62 of FIG. 4, the apparatus 45, such as a processor 50, may then identify an electronic resource associated with the hand-drawn indicator. Although the association between the electronic resource and the hand-drawn indicator may be provided in various manners, the apparatus 45 of one embodiment includes or has access to a database or other repository that includes one or more associations between electronic resources and corresponding reference indicators. As described below, a reference indicator may be a hand-drawn indicator that was previously provided by the user and associated with the electronic resource so as to establish the linkage therebetween. In this embodiment, the apparatus 45 may identify the electronic resource that is associated with a hand-drawn indicator by including means, such as the processor 50 or the like, for identifying the hand-drawn indicator to be a representation of a reference indicator. See operation 74 of FIG. 9. For example, one or more reference indicators may be stored, such as in memory device 56, in association with corresponding electronic resources. The processor 50 of this embodiment may therefore compare the hand-drawn indicator with each of the reference indicators to identify the reference indicator, if any, that matches the hand-drawn indicator, at least to within a predefined level of certainty. This comparison of the hand-drawn indicator to one or more reference indicators may be based upon a comparison of respective images of the hand-drawn indicator and the reference indicator(s) or may be performed in other manners, such as based upon a comparison between one or more attributes of the image of the hand-drawn indicator and one or more corresponding attributes of the reference indicators.

In an instance in which the apparatus 45, such as a processor 50, identifies the hand-drawn indicator to be a representation of a reference indicator, such as in an instance in which the hand-drawn indicator matches or is sufficiently similar to a reference indicator, the apparatus 45 may include means, such the processor 50 or the like, for determining the electronic resource that is associated with the reference indicator. See operation 76 of FIG. 9. In this regard, the processor 50 may access a database or other repository, such as may be stored in the memory device 56, in order to determine the electronic resource that is associated with the reference indicator. As noted above and as will be described below, the associations between one or more electronic resources and corresponding reference indicators may be predefined and stored, for example, in the memory device 56.

In an embodiment in which the apparatus 45 is embodied by a mobile terminal 15, the database or other repository may be stored by the memory 42, 44 of the mobile terminal 15. Alternatively, the database or other repository may be stored by memory of a network entity 12, such as a server, such that the processor 22 of the mobile terminal 15 determines the electronic resource that is associated with the reference indicator by providing the network entity 12 with the reference indicator or various attributes of the reference indicator and receiving from the network entity 12, in response, the electronic resource or indication of the electronic resource that is associated with the reference indicator. In yet another embodiment in which the apparatus 45 is embodied by a network entity 12, such as a server, the processor 50 of the network entity 12 may both identify the hand-drawn indicator to be a representation of the reference indicator and then determine the electronic resource that is associated with the reference indicator based upon a database or other repository, such as in memory device 56, storing predefined associations between the reference indicators and corresponding electronic resources. In this embodiment, the apparatus 45 embodied by a network entity 12, such as a server, may have received the hand-drawn indicator or attributes thereof from a user device 10 and may then provide the electronic resource or at least an indication or designation of the electronic resource, e.g., a link to the electronic resource, to the user device 10 such that the user may access the electronic resource. In each of the foregoing embodiments, the identification of the hand-drawn indicator to be a representation of the reference indicator and the subsequent determination of the electronic resource that is associated with the reference indicator effectively associates the electronic resource with the hand-drawn indicator.

As described above in conjunction with operation 64 of FIG. 4, an apparatus 45, such as a processor 50, may then permit access to the electronic resource associated with the hand-drawn indicator as shown by operation 78 of FIG. 9. In the embodiment in which the apparatus 45 is embodied by a mobile terminal 15, such as shown in FIG. 2, the mobile terminal 15 may include means, such as the processor 22, for permitting access to the electronic resource, for example, by opening or launching the electronic resource or by providing an address, such as a URL or other link, to the electronic resource that may be selected by the user in order to open or launch the electronic resource. Alternatively, in an embodiment in which the apparatus 45 is embodied by a network entity 12, such as a server, the network entity 12 may include means, such as a processor 50, the communication interface 54 or the like, for providing the electronic resource or the address or other link to the electronic resource to the user device 10.

The associations between one or more reference indicators and corresponding electronic resource(s) may be defined in various manners. In one embodiment shown, for example, in FIG. 10, the association between a reference indicator and a corresponding electronic resource may be established by initially receiving an image of the reference indicator. In this regard, the apparatus 45 may include means, such as a camera 58, a processor 50, a communication interface 54 or the like, for receiving an image of the reference indicator. See operation 82 of FIG. 10. In this regard, the camera 58 of the apparatus 45 of FIG. 3 may capture an image of the reference indicator and may provide the image of the reference indicator or one or more attributes of the image of the reference indicator to the processor 50. For example, in an embodiment in which the apparatus 45 is embodied by a mobile terminal 15, the mobile terminal 15 may include a camera 40 for capturing an image of the reference indicator and for then providing the image of the reference indicator or attributes of the image of the reference indicator to the processor 22. Alternatively, in an embodiment in which the apparatus 45 is embodied by a network entity 12, such as a server, the apparatus 45 may include means, such as the processor 50, the communications interface 54 or the like, for receiving the image of the reference indicator or attributes of the image of the reference indicator from, for example, the user device 10.

As described above in conjunction with a hand-drawn indicator, a user may draw the reference indicator and may then capture an image of the reference indicator. As before, the reference indicator may have any of a number of different forms including a free-form hand-drawn reference indicator such as shown in FIG. 5 or a grid-based hand-drawn reference indicator, such as shown in FIGS. 6-8. As also described in conjunction with the hand-drawn indicator, the image of the reference indicator may be displayed and the apparatus 45 may include means, such as a user interface 52, the processor 50, the communications interface 54 or the like, for receiving an indication of the portion of the image that includes the reference indicator, either directly from the user in an instance in which the apparatus 45 is embodied by a user device 10 or from the user device 10 in an instance in which the apparatus 45 is embodied by a network entity 12.

As shown in operation 84 of FIG. 10, the apparatus 45 of this embodiment may also include means, such as the processor 50, the user interface 52, the communications interface 54 or the like, for receiving an indication of the corresponding electronic resource. In this regard, the user may provide input, such as in the form of the selection of an icon or other representation of the electronic resource, the entry of an address, such as a URL associated with the electronic resource, or otherwise. As such, in an embodiment in which the apparatus 45 is embodied as a user device 10, such as the mobile terminal of FIG. 2, the indication of the corresponding electronic resource may be provided by the user, such as via the display 30, keypad 32 or the like. Alternatively, in an embodiment in which the apparatus 45 is embodied as a network entity 12, the indication of the corresponding electronic resource may be provided by the user device 12.

Based upon the image of the reference indicator that has been received and the indication of a corresponding electronic resource that has been received, the apparatus 45 of this embodiment may also include means, such as a processor 50 or the like, for associating the reference indicator with the corresponding electronic resource, thereby linking the reference indicator and the corresponding electronic resource. See operation 86 of FIG. 10. As shown in operation 88 of FIG. 10, the apparatus 45 of this embodiment may also include means, such as the processor 50, the memory device 56 or the like, for maintaining the association between the reference indicator and the corresponding electronic resource. This process may be repeated in order to define a plurality of associations between reference indicators and corresponding electronic resources with the plurality of associations being maintained, such as in the memory device 56, for subsequent reference in conjunction with efforts to identify electronic resources associated with a hand-drawn indicator that is intended to match a reference indicator.

As such, one or more reference indicators may be defined in advance and associated with corresponding electronic resources. Thereafter, a hand-drawn indicator that matches or is otherwise substantially similar to a respective one of the reference indicators may be included in a handwritten work. By capturing an image of the hand-drawn indicator and then analyzing the image of the hand-drawn indicator, the method, apparatus 45 and computer program product of example embodiments of the present invention may permit access to the electronic resource associated with the hand-drawn indicator in an efficient and reliable manner.

As described above, FIGS. 4, 9 and 10 illustrate flowcharts of an apparatus 45, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 56 of an apparatus 45 employing an embodiment of the present invention and executed by a processor 50 of the apparatus 45. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified, such as illustrated by a comparison of the operations of FIG. 9 to the operations of FIG. 4. Furthermore, in some embodiments, additional optional operations may be included. Modifications, additions, or amplifications to the operations above may be performed in any order and in any combination.

The method, apparatus 45 and computer program product may be utilized in various scenarios. For example, a user may rely upon a hand-drawn indicator in order to access an electronic resource that is associated with the user, such as a result of being created, stored or otherwise accessible by the user. Alternatively, a user may rely upon a hand-drawn indicator to access an electronic resource of another user. By way of example, a first user may create and/or otherwise control the access privileges associated with an electronic resource that is, in turn, associated with a hand-drawn indicator. In order to allow a second user to access the electronic resource in an efficient manner, the first user may provide the second user with the hand-drawn indicator such that the second user may then utilize the hand-drawn indicator, e.g., by capturing an image of the hand-drawn indicator with a mobile terminal 15 of the second user, to access the electronic resource of the first user. In a more particular example, the first and second users may established a relationship, such as by being friends, over a social networking site. Armed with the hand-drawn indicator from the first user, the second user may cause an image of the hand-drawn indicator to be captured and to be provided (either the image of the hand-drawn indicator or attributes thereof) to the account of the first user at the social networking site. As such, the second user may be provided with access to the electronic resource stored by the first user via the social networking site.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving an image that has been captured by a camera of a handwritten work including a hand-drawn indicator and other elements or information;
   receiving an indication of a first portion of the image that includes the hand-drawn indicator, wherein the indication is based upon user input provided following receipt of the image;
   identifying, with a processor, an electronic resource associated with the hand-drawn indicator in the first portion of the image without consideration of the other elements or information in another portion of the image, wherein identifying an electronic resource comprises identifying the hand-drawn indicator to be a representation of a reference indicator and determining the electronic resource that is associated with the reference indicator, thereby associating the electronic resource with the hand-drawn indicator; and
   permitting access to the electronic resource associated with the hand-drawn indicator.

2. A method according to claim 1 further comprising maintaining a plurality of associations between reference indicators and corresponding electronic resources.

3. A method according to claim 1 further comprising establishing an association between a reference indicator and a corresponding electronic resource, wherein establishing the association comprises receiving an image of the reference indicator, receiving an indication of the corresponding electronic resource and associating the reference indicator to the corresponding electronic resource.

4. A method according to claim 1 further comprising causing the image of the hand-drawn indicator and other elements or information to be presented, and wherein receiving the indication comprises receiving user input providing the indication of the first portion of the image that includes the hand-drawn indicator.

5. A method according to claim 1 wherein receiving the image comprises receiving the image of a free-form hand-drawn indicator.

6. A method according to claim 1 wherein receiving the image comprises receiving the image of the hand-drawn indicator in a form of a grid having a plurality of selectively fellable grid elements.

7. A method according to claim 1 further comprising receiving an indication of an account with which the hand-drawn indicator is related.

8. An apparatus comprising at least one processor and at least one memory including computer program code, the at least one memory and the computer program code configured to, with the processor, cause the apparatus to at least:
   receive an image that has been captured by a camera of a handwritten work including a hand-drawn indicator and other elements or information;
   receiving an indication of a first portion of the image that includes the hand-drawn indicator, wherein the indication is based upon user input provided following receipt of the image;
   identify an electronic resource associated with the hand-drawn indicator in the first portion of the image without consideration of the other elements or information in another portion of the image; and
   permit access to the electronic resource associated with the hand-drawn indicator,
   wherein the at least one memory and the computer program code are configured to, with the processor, cause the apparatus to identify an electronic resource by identifying the hand-drawn indicator to be a representation of a reference indicator and determining the electronic resource that is associated with the reference indicator, thereby associating the electronic resource with the hand-drawn indicator.

9. An apparatus according to claim 8 wherein the at least one memory and the computer program code are further configured to, with the processor, cause the apparatus to maintain a plurality of associations between reference indicators and corresponding electronic resources.

10. An apparatus according to claim 8 wherein the at least one memory and the computer program code are further configured to, with the processor, cause the apparatus to establish an association between a reference indicator and a corresponding electronic resource by receiving an image of the reference indicator, receiving an indication of the corresponding electronic resource and associating the reference indicator to the corresponding electronic resource.

11. An apparatus according to claim 8 wherein the at least one memory and the computer program code are further configured to, with the processor, cause the apparatus to cause the image of the hand-drawn indicator and other elements or information to be presented and wherein the at least one memory and the computer program code are configured to, with the processor, cause the apparatus to receive an indication by receiving user input providing the indication of the first portion of the image that includes the hand-drawn indicator.

12. An apparatus according to claim 8 wherein the at least one memory and the computer program code are configured to, with the processor, cause the apparatus to receive the image by receiving the image of a free-form hand-drawn indicator.

13. An apparatus according to claim 8 wherein the at least one memory and the computer program code are configured to, with the processor, cause the apparatus to receive the image by receiving the image of the hand-drawn indicator in a form of a grid having a plurality of selectively fillable grid elements.

14. An apparatus according to claim 8 wherein the at least one memory and the computer program code are further configured to, with the processor, cause the apparatus to receive an indication of an account with which the hand-drawn indicator is related.

15. A computer program product comprising at least one non-transitory computer-readable storage medium having computer-executable program code instructions stored therein, the computer-executable program code instructions comprising program code instructions to:

receive an image that has been captured by a camera of a handwritten work including a hand-drawn indicator and other elements or information;

receive an indication of a first portion of the image that includes the hand-drawn indicator, wherein the indication is based upon user input provided following receipt of the image;

identify an electronic resource associated with the hand-drawn indicator in the first portion of the image without consideration of the other elements or information in another portion of the image; and permit access to the electronic resource associated with the hand-drawn indicator, wherein the program code instructions for receiving the image comprise program code instructions for identifying the hand-drawn indicator to be a representation of a reference indicator and determining the electronic resource that is associated with the reference indicator, thereby associating the electronic resource with the hand-drawn indicator.

16. A computer program product according to claim 15 wherein the computer-executable program code instructions further comprise program code instructions for causing the image of the hand-drawn indicator and other elements or information to be presented, and wherein the program code instructions for receiving the image comprise program code instructions for receiving user input providing the indication of the first portion of the image that includes the hand-drawn indicator.

17. A computer program product according to claim 15 wherein the program code instructions for receiving the image comprise program code instructions for receiving the image of the hand-drawn indicator in a form of a grid having a plurality of selectively fellable grid elements.

18. A method according to claim 1 wherein the electronic resource comprises a content item.

19. An apparatus according to claim 8 wherein the electronic resource comprises a content item.

20. A computer program product according to claim 15 wherein the electronic resource comprises a content item.

* * * * *

UNITED STATES PATENT AND TRADEMARK OFFICE
CERTIFICATE OF CORRECTION

Page 1 of 1

PATENT NO.         : 8,718,374 B2
APPLICATION NO.    : 13/212692
DATED              : May 6, 2014
INVENTOR(S)        : Ashbrook It is certified that error appears in the above-identified patent and that said Letters Patent is hereby corrected as shown below:

In the Claims

Column 18, Claim 6,
Line 26, "fellable grid elements" should read --fillable grid elements--.

Column 20, Claim 17,
Line 28, "fellable grid elements" should read --fillable grid elements--.

Signed and Sealed this
Ninth Day of September, 2014

Michelle K. Lee
*Deputy Director of the United States Patent and Trademark Office*